US012702982B2

(12) United States Patent
Olivier

(10) Patent No.: US 12,702,982 B2
(45) Date of Patent: Aug. 11, 2026

(54) RACK FOR HOLDING A PLURALITY OF PETRI-DISHES AND TRANSPORT PACKAGING WITH THE RACK

(71) Applicant: Merck Patent GmbH, Darmstadt (DE)

(72) Inventor: Stephane Olivier, Molsheim (FR)

(73) Assignee: Merck Patent GmbH, Darmstadt (DE)

( * ) Notice: Subject to any disclaimer, the term of this patent is extended or adjusted under 35 U.S.C. 154(b) by 610 days.

(21) Appl. No.: 18/032,913

(22) PCT Filed: Oct. 20, 2021

(86) PCT No.: PCT/EP2021/079014
§ 371 (c)(1),
(2) Date: Apr. 20, 2023

(87) PCT Pub. No.: WO2022/084358
PCT Pub. Date: Apr. 28, 2022

(65) Prior Publication Data
US 2023/0390780 A1 Dec. 7, 2023

(30) Foreign Application Priority Data
Oct. 23, 2020 (EP) .................................... 20306272

(51) Int. Cl.
*B01L 9/00* (2006.01)

(52) U.S. Cl.
CPC ............. *B01L 9/52* (2013.01); *B01L 2200/18* (2013.01)

(58) Field of Classification Search
CPC .. B01L 9/52; B01L 2200/18; B01L 2200/185; C12M 23/38; C12M 23/48; C12M 23/10; C12M 23/46
See application file for complete search history.

(56) References Cited

U.S. PATENT DOCUMENTS

| | | | | |
|---|---|---|---|---|
| 5,390,792 A * | 2/1995 | Van Ness | A61L 2/26 206/439 |
| 5,740,924 A * | 4/1998 | Hunt | G11B 23/0236 312/9.9 |
| 2002/0053525 A1 | 5/2002 | Zingre | |
| 2012/0251275 A1 | 10/2012 | Malin | |

FOREIGN PATENT DOCUMENTS

| | | |
|---|---|---|
| CN | 207191762 U | 4/2018 |
| CN | 210261750 U | 4/2020 |

OTHER PUBLICATIONS

International Search Report PCT/EP2021/079014 dated Feb. 14, 2023 (pp. 1-3).

* cited by examiner

*Primary Examiner* — Charles Capozzi
*Assistant Examiner* — Michael Stanley Gzybowski
(74) *Attorney, Agent, or Firm* — Csaba Henter; MILLEN, WHITE, ZELANO & BRANIGAN, P.C.

(57) ABSTRACT

A rack for holding a plurality of petri-dishes, containing a plate-like main body with a plurality of adjacent and spaced apart holding portions each configured to receive and support, in a substantially horizontal orientation that is substantially perpendicular to a plane of the plate-like main body, a petri-dish, wherein each holding portion includes positioning features for positioning the petri-dish in the holding portion.

16 Claims, 8 Drawing Sheets

RACK FOR HOLDING A PLURALITY OF PETRI-DISHES AND TRANSPORT PACKAGING WITH THE RACK

TECHNICAL FIELD

The present application concerns a rack for holding a plurality of petri-dishes and a transport packaging, preferably in the form of a blister packaging with the rack. The present application particularly concerns the field of testing in pharmaceutical and food processing and more particularly environmental monitoring of clean or ultra clean processing areas. It is also applicable to other processing situations where cleanness of a processing area or environment is to be determined and monitored, for example in the field of semiconductor, electronics or aircraft manufacturing.

BACKGROUND

In order to monitor environmental conditions in closed processing areas of the above type it is common practice in passive air sampling to place one or more media plate/plates in an activity zone of the production area and expose them to the surrounding air such that they can capture the maximum amount of particles in the surrounding air. Larger particles tend to settle faster on the plates due to gravitational force. Smaller particles take some time in settling due to factors such as air currents. Media plates work best in still areas. The microorganisms from the air may settle on the media plates alone or in colonies.

In active monitoring of air in production areas a microbial air sampler is used to force air into or onto a collection medium over a specified period of time. The collection medium can be a common petri-dish, for example including a nutrient agar-based test media or other suitable test media depending on the need.

The collection media, for example in the form of the petri-dishes, media plates or settle plates (the terms will be used interchangeably in this specification), have to be transferred repeatedly into the production area and removed therefrom for further handling and evaluation. This is commonly done in a manual process where one or more plates or petri-dishes are conveyed manually through a sterile transfer port into and from the interior of the production area. However, the manual handling of the petri-dishes involves a high risk of contamination when handling the media plate after a lid, cover or seal has been opened, and an non-secure transfer of the media plates during the introduction, installation, removal and further handling, in particular when a plurality of them are handled at once as a set or batch or group, for example in a stack. Maintaining several petri-dishes in a group during a sequence of processing steps is moreover a complex task and requires measures like taping or bundling several petri-dishes together and/or marking them.

Further, the individual petri-dishes as such are not particularly suitable for automated handling in batches or stacks as they typically consist of a media plate holding the nutrient media and a lid or cover releasably covering the plate. It is difficult for automated handling equipment to securely grip, hold and transfer the smooth cylindrical peripheral surfaces of the media plate and/or lid/cover as they require a defined position and orientation for gripping, and there is a high risk that lids are inadvertently opened, displaced or removed from their media plates during handling at the various stages of the process, thereby compromising the detection result.

US 2002/053525 A1 discloses a cassette arrangement for accommodating petri-dishes or the like. The arrangement includes a box-shaped cassette housing designed to be stackable and having a slotted opening on one lateral side for inserting or removing the petri-dish from an interior space of the housing. The box-shaped cassette housing is stackable and has finger-operated means arranged on an opposite end side for pushing the petri-dish in the cassette housing out at least partially through the opening. While this cassette arrangement provides for a safe transport of the petri-dish held in the interior space of the cassette housing, it is not useful for automated handling as it is specifically directed to a manual operation by a finger in order to at least release the petri-dish from the housing. Further, the stacking capability is not specifically reliable and likewise not suitable for automated handling of a stack of cassette housings.

What is desired is an at least partly or preferably fully automated process that does not involve human handling steps for introducing, installing and removing the media plates into and from the production areas and further stages of the evaluation processes.

It is furthermore preferable to provide means for such a partly or fully automated process with which it is possible to use standard media plates available on the market, preferably the so-called petri-dishes.

The present application accordingly aims at providing a device for holding a plurality of petri-dishes and a transport packaging, preferably in the form of a blister packaging with a plurality of petri-dishes, which allows secure handling of petri-dishes or settle plates used for microbiological air sampling in a classified or non-classified environment reducing the risk of false positive and final product contamination, which allows a secure handling during the air testing from storage, transportation to sampling area, sampling, counting, waste management for passive or active microbiological air sampling in a fully or partially automated process, i.e. the manual handling should at least not be excluded.

SUMMARY

According to the present application this object is solved by providing a rack for holding a plurality of petri-dishes as defined in claim 1 and a transport packaging for a plurality of petri-dishes as defined in claim 11 as well as a blister packaging with a plurality of petri-dishes as defined in claim 16. Preferred embodiments are defined in the dependent claims.

The present application specifically provides a rack for holding a plurality of petri-dishes, comprising a plate-like main body with a plurality of adjacent and spaced apart holding portions each configured to receive and support, in a substantially horizontal orientation that is substantially perpendicular to a plane of the plate-like main body, a petri-dish, wherein each holding portion includes positioning features for positioning the petri-dish in the holding portion.

Preferably, each holding portion is respectively formed as a cut-out, preferably in the form of a window, in the plate-like main body so as to surround an outer perimeter of the petri-dish to be received in the holding portion as seen in a cross-section perpendicular to upper and lower surfaces of a tray and a lid of the petri-dish and so as to allow at least partial insertion of the petri-dish into the cut-out/window.

Preferably, the plate-like main body includes, at a periphery of each cut-out, at least two openings or recesses spaced apart from each other about the periphery of the cut-out and configured to allow insertion of a manipulating device or of a finger for grabbing/pinching of a circumferential peripheral wall of a petri-dish when the same is placed in the cut-out.

Preferably, the first positioning features comprise one or more flexible tabs configured to contact a/the circumferential peripheral wall of the petri-dish when the same is placed in the cut-out.

Preferably, the holding portions are formed in the plate-like main body so that a front surface of the plate-like main body is parallel to and offset by a distance from a fictive plane through the centers of the plural petri-dishes when the petri-dishes are received in the holding portions.

Preferably, the rack further comprises a stand configured to be assembled with the plate-like main body to hold it in an upright orientation so that any petri-dishes can be received and supported in the holding portions in the substantially horizontal orientation.

Preferably, the stand is removable from the plate-like main body or is connected to the plate-like main body and/or is foldable or pivotable between a storing position and an operative position where it can hold the plate-like main body in the upright orientation.

Preferably, the stand comprises one or more members that are configured to be assembled to form, with the plate-like main body, a three-dimensional, self-supporting frame for the rack in the operative position.

Preferably, the one or more members is/are provided with engaging features, preferably in the form of openings or cut-outs, that are respectively aligned with the holding portions to additionally support the petri-dish in the respective holding portion in the substantially horizontal orientation when in the operative position.

Preferably, the plate-like main body and preferably the one or more members of the stand, if provided, is/are formed as parts stamped or cut-out from a sheet-like material.

The present application also provides a transport packaging for a plurality of petri-dishes, comprising a rack as defined herein, and a box-shaped tub or bag configured to removably receive and completely surround the rack.

Preferably, the box-shaped tub is formed as a one-piece blister cavity, preferably formed from a formable sheet or web material, further preferably by thermoforming or cold-forming or a combination thereof.

Preferably, the opening of the box-shaped tub is configured to be sealed by a gas barrier film, preferably at least partially transparent, to form a blister-like packaging.

Preferably, the box-shaped tub and the rack are made from the same material. The present application also provides the transport packaging for a plurality of petri-dishes comprising a plurality of petri-dishes accommodated in the rack.

The present application further provides a blister packaging with a plurality of petri-dishes, comprising a transport packaging as defined herein, wherein the plurality of petri-dishes are accommodated in the rack in the box-shaped tub in a sterile environment, and a gas barrier film, preferably at least partially transparent, sealing the opening of the box-shaped tub.

The present application accordingly provides a rack for holding a plurality of petri-dishes. It is compatible with environmental monitoring in a fully automated process. It in particular allows an accurate positioning and holding together of a set or batch of petri-dishes in a device that can be used during all the steps or stages of the monitoring process, including packaging and shipment, during introduction into the clean production area, setting in the loading and unloading area, grabbing of individual petri-dishes using a gripper or robot arm for transferring the dishes to critical areas for passive or active air monitoring, during removal from the clean production area, during incubation, reading and/or storage.

BRIEF DESCRIPTION OF THE DRAWINGS

Preferred embodiments will be described below by reference to the attached exemplary and schematic drawings, in which.

DETAILED DESCRIPTION

For the purposes of the present application, terms such as “horizontal”, “vertical”, “perpendicular”, and similar terms are—if not already explicitly indicated—considered to be “essentially horizontal”, “essentially vertical”, “essentially perpendicular”, provided that this does not negatively affect functionality. Preferably, the term “essentially” is to denote a deviation of at most 10°, more preferably of at most 5°, even more preferably of at most 4° or 3°, still even more preferably of at most 2° or 1° from being horizontal, vertical, and perpendicular, respectively.

An embodiment of the present rack 1 for holding a plurality of petri-dishes P as shown 30 in the figures generally comprises a plate-like main body 2 with a plurality of adjacent and preferably regularly spaced-apart holding portions 3 which are each configured to receive and support, in a substantially horizontal orientation that is substantially perpendicular to a plane of the plate-like main body 2, an individual petri-dish P.

Figure 2:
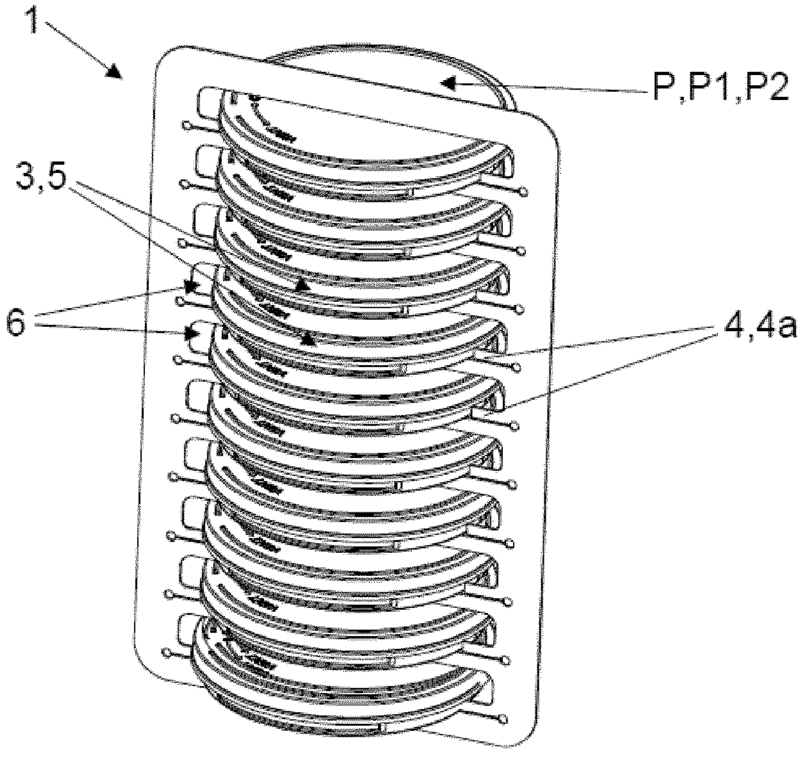
FIG. 2 is a perspective view of the rack of FIG. 1 with the petri-dishes supported in the rack.

Each holding portion 3 is respectively formed as a cut-out or window 5 in the plate-like main body 2 so as to surround an outer perimeter Pp of the petri-dish P to be received in the holding portion 3 or cut-out/window 5 as seen in a cross section in the plane of the plate-like main body 2 that is also substantially perpendicular to upper and lower flat surfaces of a tray P2 and a lid P1 of the petri-dishes P. Accordingly, the holding portions 3 in the form of the cut-outs/windows 5 allow at least partial, preferably full insertion of the petri-dishes P as shown in FIG. 2. For partial insertion, it is preferred that the center of a petri-dish is towards the rear of the plate-like main body, or expressed differently that less than half of the diameter of the petri-dish "sticks out" of the present rack.

Figure 1:
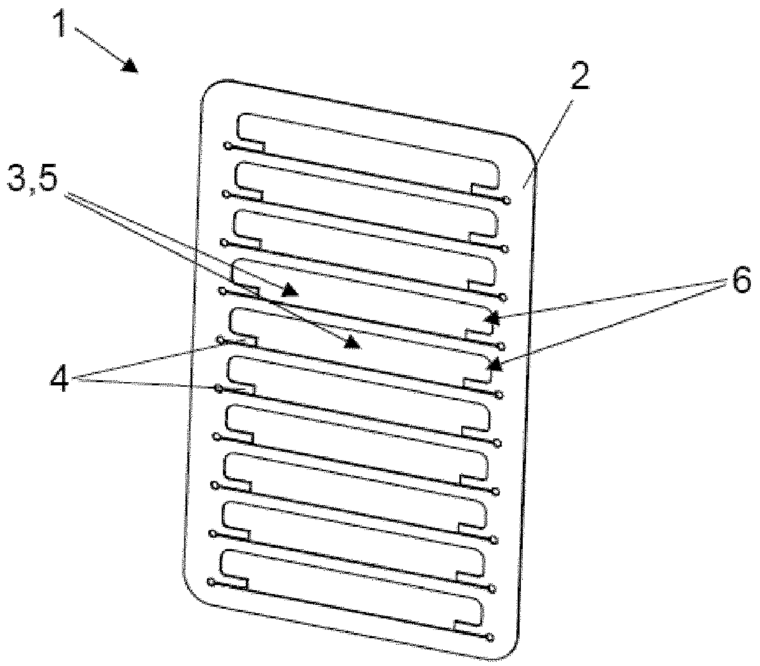
FIG. 1 is a perspective view of the rack for holding a plurality of petri-dishes according to an embodiment.

The cut-outs/windows 5 are preferably aligned in a single row as shown in FIGS. 1 and 2 or in a plurality of parallel rows but they may be staggered and aligned to form two or more parallel interleaved rows (not shown). The arrangement in rows with repeated equal spacing defines precise gripping positions and orientations of the petri-dishes supported in the rack which facilitates the use of automated equipment for the handling of the petri-dishes.

Figure 3:
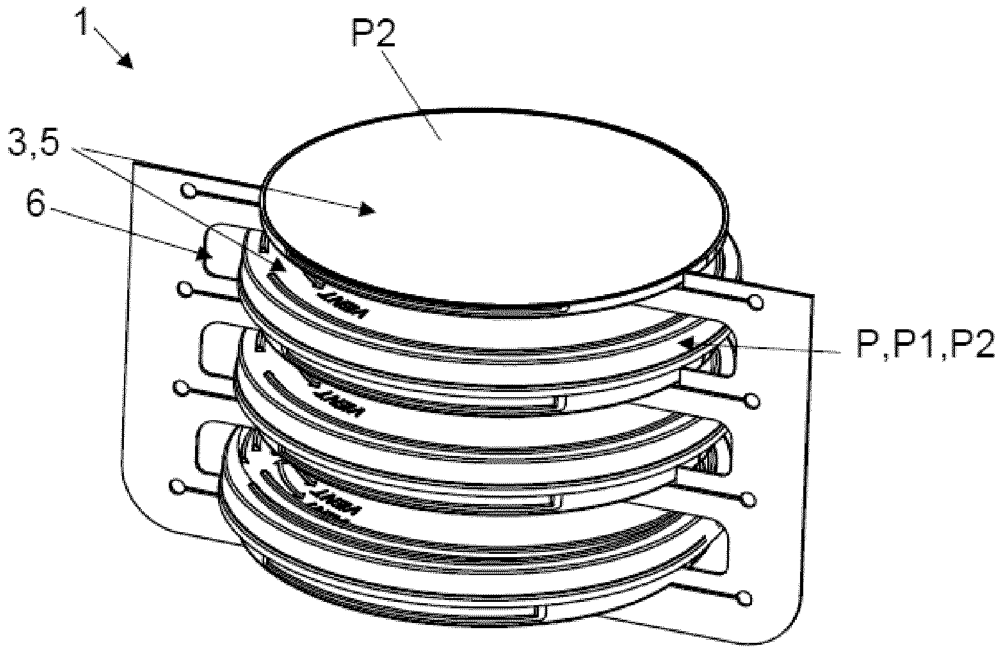
FIG. 3 is a partial cut-away view of a lower section of the rack with the petri-dishes of FIG. 2.

Each holding portion 3 includes positioning features 4 for positioning each petri-dish P in each holding portion 3. In the preferred embodiment the positioning features 4 comprise one or more lateral flexible tabs 4*a* (two in the embodiment) which are configured to contact the circumferential peripheral wall Pc of the petri-dish P from two opposite sides when the same is placed in the cut-out/window 5 as shown in FIG. 2 or 3. The resiliency of the tabs 4*a* is defined, in conjunction with their shape, to provide a certain resistance against the petri-dish falling out from the cut-out/window 5, but to be overcome by a gripper or by hand when the petri-dish is to be withdrawn from the holding portion 3.

In the present embodiment the lateral flexible tabs 4*a* are integrally formed with the plate-like main body 2 adjacent to the cut-outs/windows 5. Creating the tabs 4*a* in this manner can be achieved by partially cutting out the periphery of the tabs leaving a connection with the rest of the main body 2 as shown in FIG. 1 or 2. The number, size, location and shape of the tabs 4*a* is only an example and modification in each of these parameters can be made as long as the purpose of releasably fixing the petri-dish in the cut-out or window is achieved.

Figure 11:
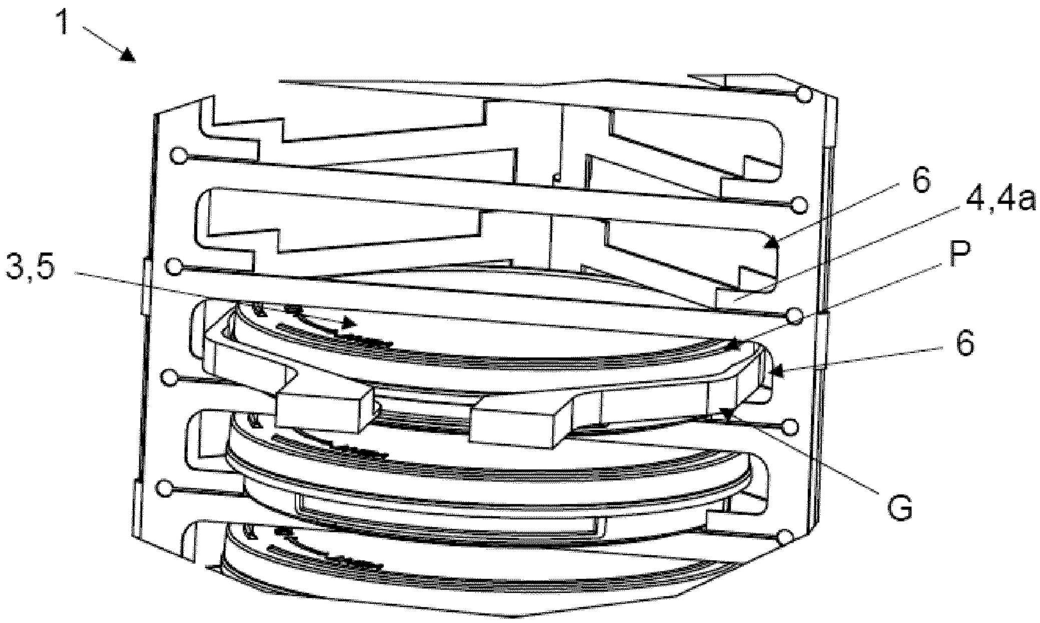
FIG. 11 is a partially cut-away view of a detail of the rack of FIGS. 9 and 10, showing the situation that a gripper engages with the petri-dish in the rack.
Figure 12:
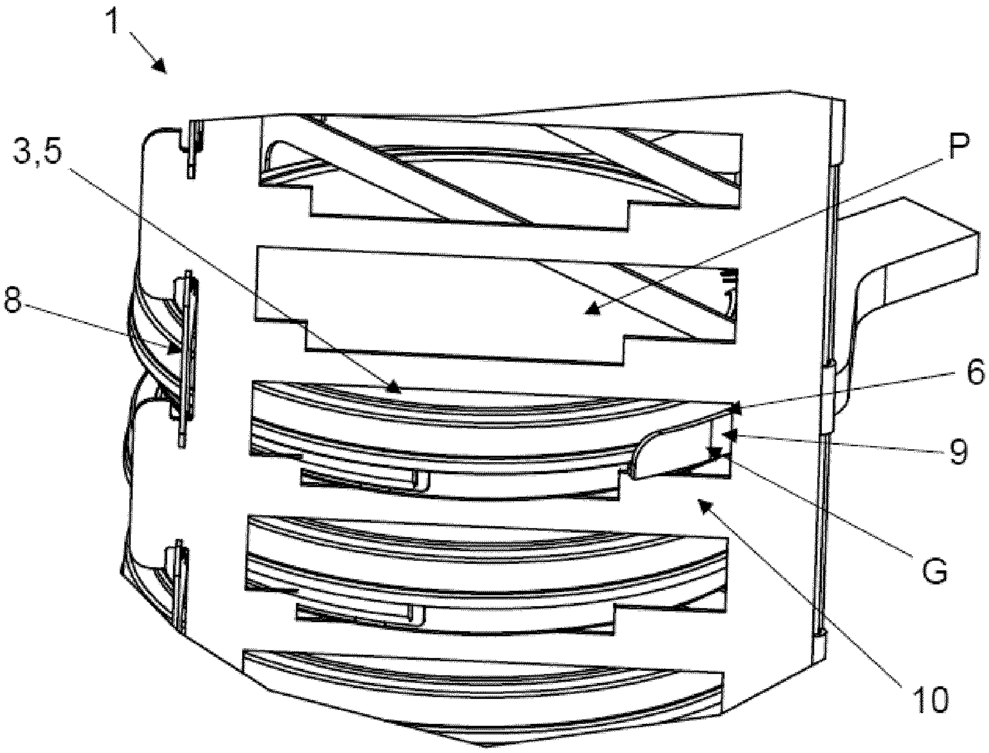
FIG. 12 is a perspective, partially cut-away view from the rear side of the rack of FIG. 11, showing the engaging state of the gripper.

The plate-like main body 2 furthermore includes, at a periphery of each cut-out/window 5, at least 2 enlarged openings or recesses 6 spaced apart from each other about the periphery of the cut-out/window 5 and configured to allow insertion of a manipulating device or gripper G or of a pair of fingers for grabbing/pinching of the circumferential peripheral wall Pc of the petri-dish P when the same is placed in the cut-out/window 5, while avoiding touching of the plate-like main body 2 (see FIGS. 11 and 12 concerning the gripping by means of a manipulating device G). The openings or recesses 6 may be an integral part of the cut-out/window and may be continuous with the cut-out/window so as to provide a sufficient clearance for the manipulating device or finger.

Figure 4:
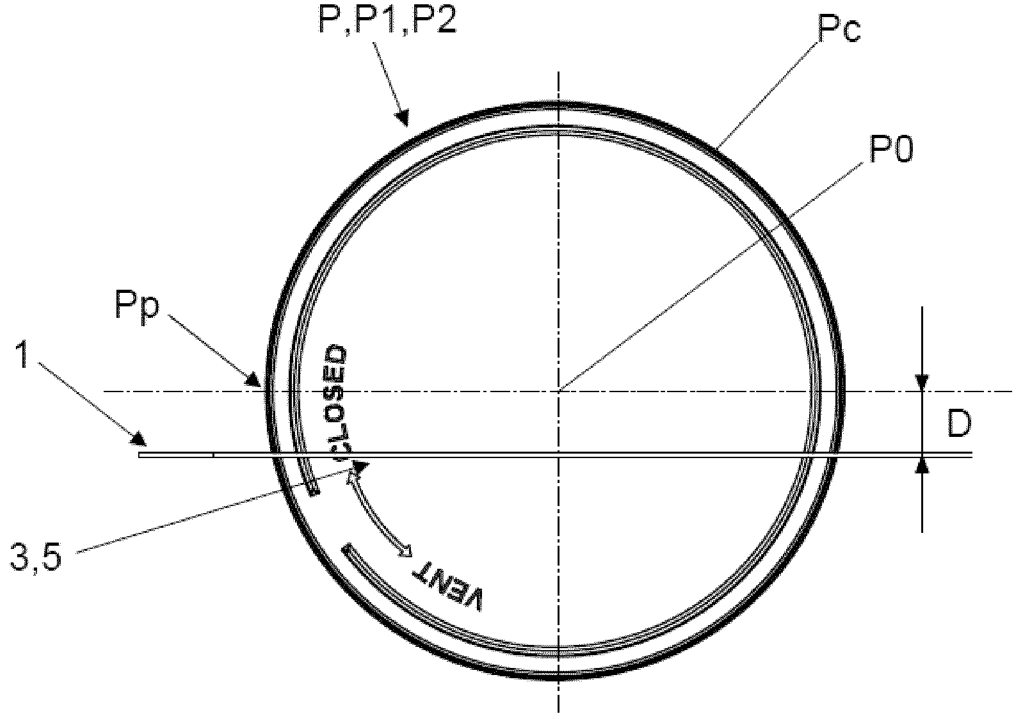
FIG. 4 is a top-plan view of a petri-dish to be received in the rack.

The holding portions 3 in the form of the cut-outs/windows 5 are formed in the plate-like main body 2 so that the front surface of the plate-like main body 2 is parallel to and offset by a distance D from a fictive plane Pp through the centers P0 of the plural petri-dishes P of a stack when the petri-dishes are received in the holding portions 3 (see FIGS. 2 and 4).

In the embodiment the offset is toward the back side of the rack so that a larger portion of the petri-dish is inserted through the holding portion towards the rear side. Thus, the center of gravity of the petri-dishes is not aligned with the plane of the plate-like main body 2 but is displaced to the rear side (which in FIG. 4 is at the top), thus avoiding the falling-out of the petri-dishes from the rack towards the front side (which in FIG. 4 is at the bottom) in a substantially vertical or upright orientation of the rack. The stable support of the petri-dishes is further secured by providing a stand as described below.

The rack 1 preferably further comprises a stand 7 that is configured to hold the plate-like main body 2 in an upright orientation such that all the petri-dishes P can be received and supported in the holding portions in the substantially horizontal orientation as shown, for example, in FIGS. 2, 3, 11, 12 and 9.

The stand 7 may be formed as a separate element from the plate-like main body 2 or may be an integral part of it. It may further be selectively attachable to or permanently connected to the plate-like main body 2 and may be formed so as to be attachable to or foldable or pivotable between a storing position and an operative position where it can form a three-dimensional self-supporting frame holding the plate-like main body 2 of the rack in the substantially upright orientation.

An example of a foldable or pivotable stand 7A is shown in FIGS. 7 to 14. In this embodiment, the stand 7A comprises 2 members 7A1, 7A2 which are hinged to the lateral sides of the plate-like main body 2 and which are configured to be assembled to form, with the plate-like main body 2, the three-dimensional, self-supporting frame for the rack 1 in the operative position in that they are folded out and interconnected with each other on the rear side. The frame in this embodiment has a form of a cylinder with a triangular cross-section.

Figure 8:
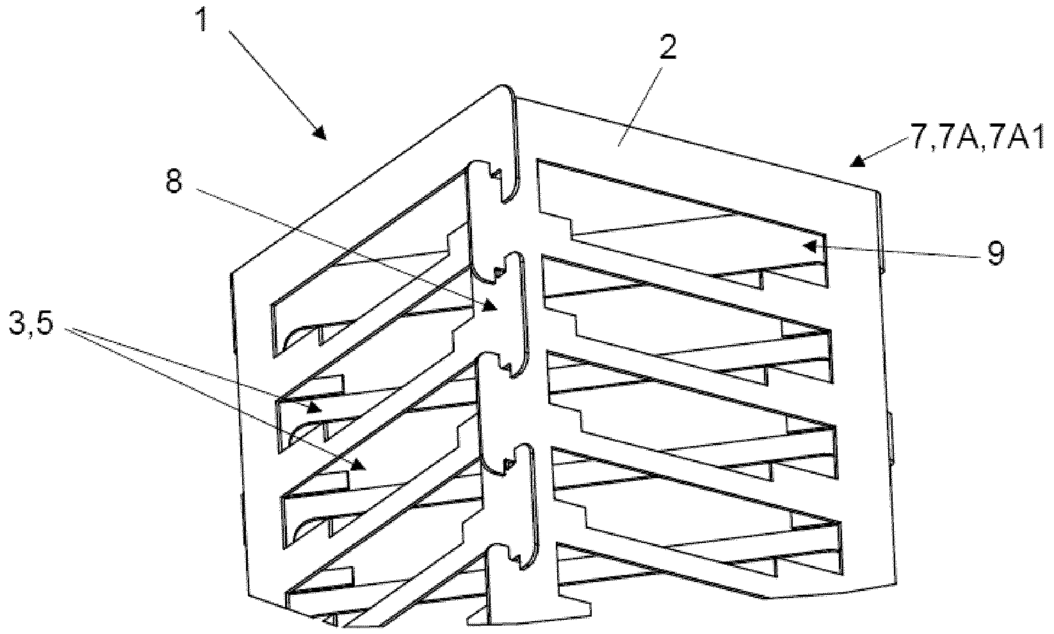
FIG. 8 is a perspective view from a rear side of the rack of FIG. 7.
Figure 9:
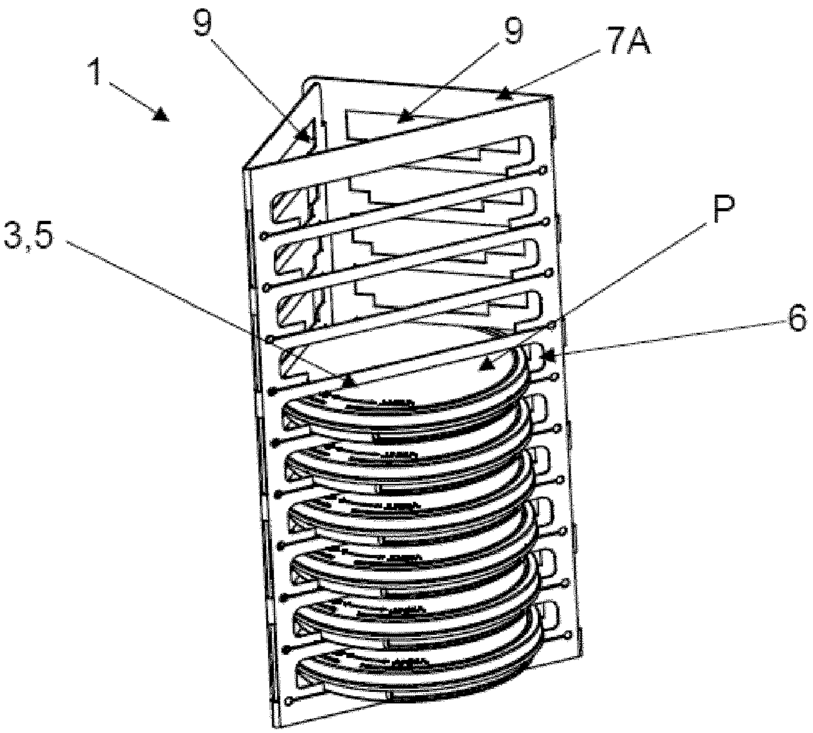
FIG. 9 is a perspective view of the rack of FIG. 7 with some petri-dishes supported in the rack.
Figure 10:
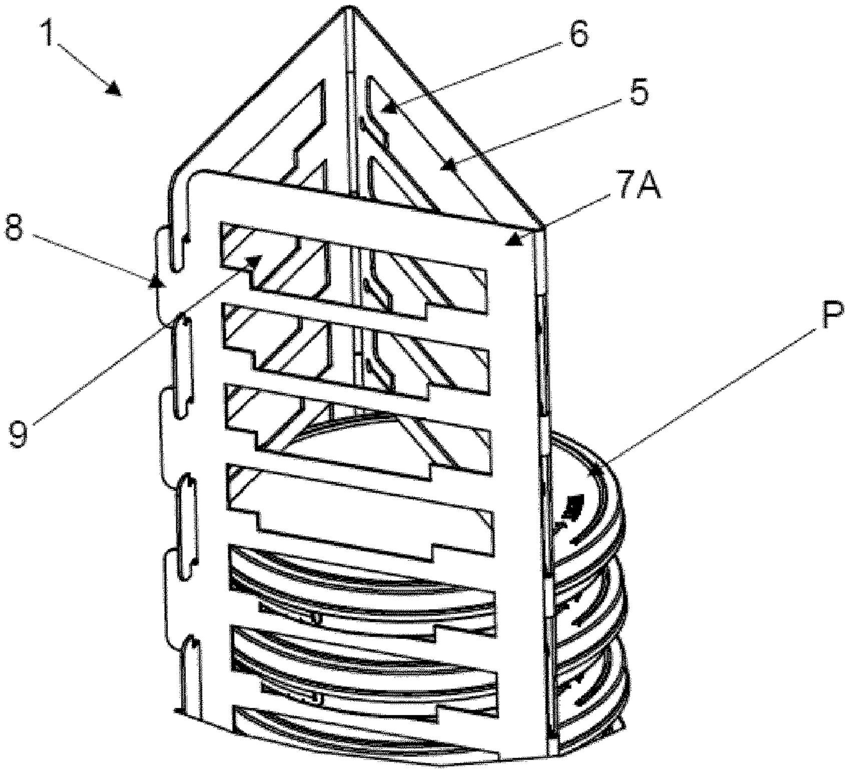
FIG. 10 is a perspective view from a rear side of a detail of the rack of FIG. 9.

The members 7A1, 7A2 are releasably connected to each other on the rear side of the rack by means of releasable locking features 8, here in the form of tabs with lateral extensions inserted into a mating cut-out to achieve a locking effect as shown in FIG. 8. The members do not have to be necessarily hinged to both lateral sides of plate-like main body 2, but can be hinged to one lateral side and to each other with the locking features connecting the unfolded member to an opposite lateral side of the plate-like main body 2. Further, the members do not have to be connected, by means of the hinges, to the plate-like main body and/or to each other but can be simply formed as separate members that are interconnected by means of the locking features 8 or any combination of hinges and locking features. The members do not necessarily have to be two of the substantially same shape but one member may be sufficient if it can be arranged and assembled to form the three-dimensional self-supporting frame for the rack.

As shown in the FIGS. 7 to 10, the members 7A1, 7A2 are provided with engaging features 9, preferably in the form of openings or cut-outs that are respectively aligned with the holding portions 3 of the plate-like main body 2 in order to allow a partial insertion of the petri-dish and additionally support the petri-dish P in the respective holding portion 3 in their substantially horizontal orientation when in the operative position. The representation in FIGS. 10 and 12 in particular shows how the engaging features 9 support the lower surfaces of the petri-dishes. In order to limit the intrusion of the petri-dishes into the engaging features 9 tabs 10 may be provided to form a stopper. The tabs 10 may be either resilient or, more preferably, rigid.

In a preferred embodiment the plate-like main body 2 and preferably one or more members 7A1, 7A2 of the stand 7 is/are formed as parts stamped or cut-out from a sheet-like material. In a preferred embodiment the members may be integrally formed with the plate-like main body and interconnected by means of so-called "living hinges" allowing the pivoting of the members relative to the plate-like main body to form the three-dimensional self-supporting frame described above.

The members of the stand 7A may alternatively be fixed together by using any integrated snap design or form-locking engagement or they may be adhered to each other using a separate connector or an adhesive that is pre-applied to the members.

The sheet-like material may be selected depending on the requirements regarding stability, frequency and duration of use and the capability of being sterilizable. It may be paper, cardboard, plastic, metal or laminates of these materials.

Figure 14:
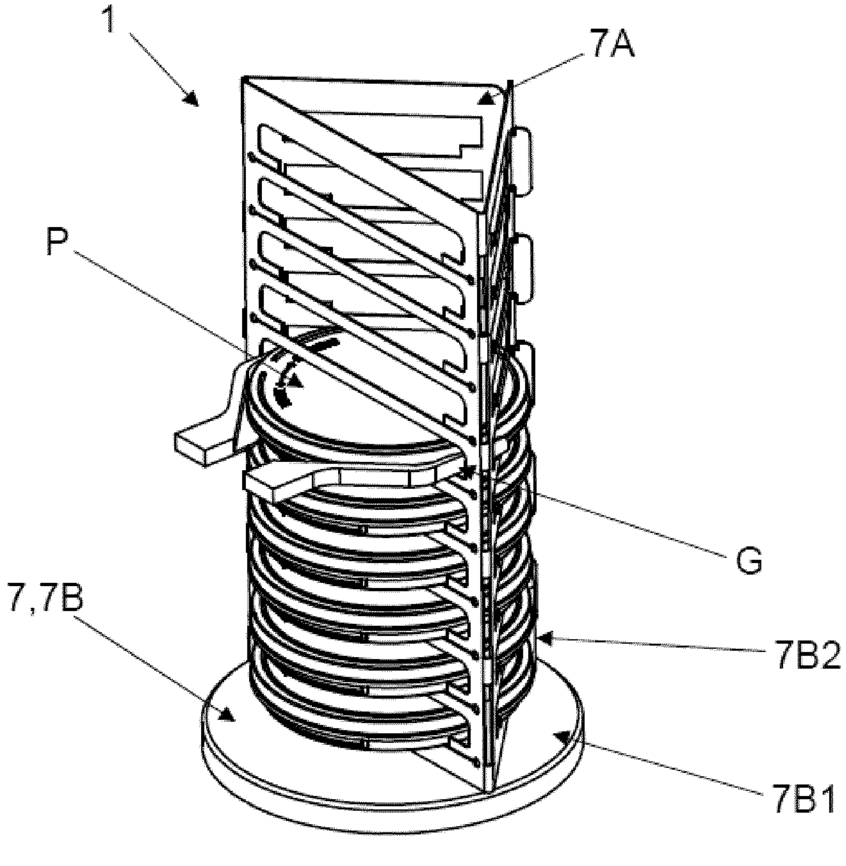
FIG. 14 is a perspective view of the rack of FIG. 9 in an upright orientation on a separate external stand.
Figure 15:
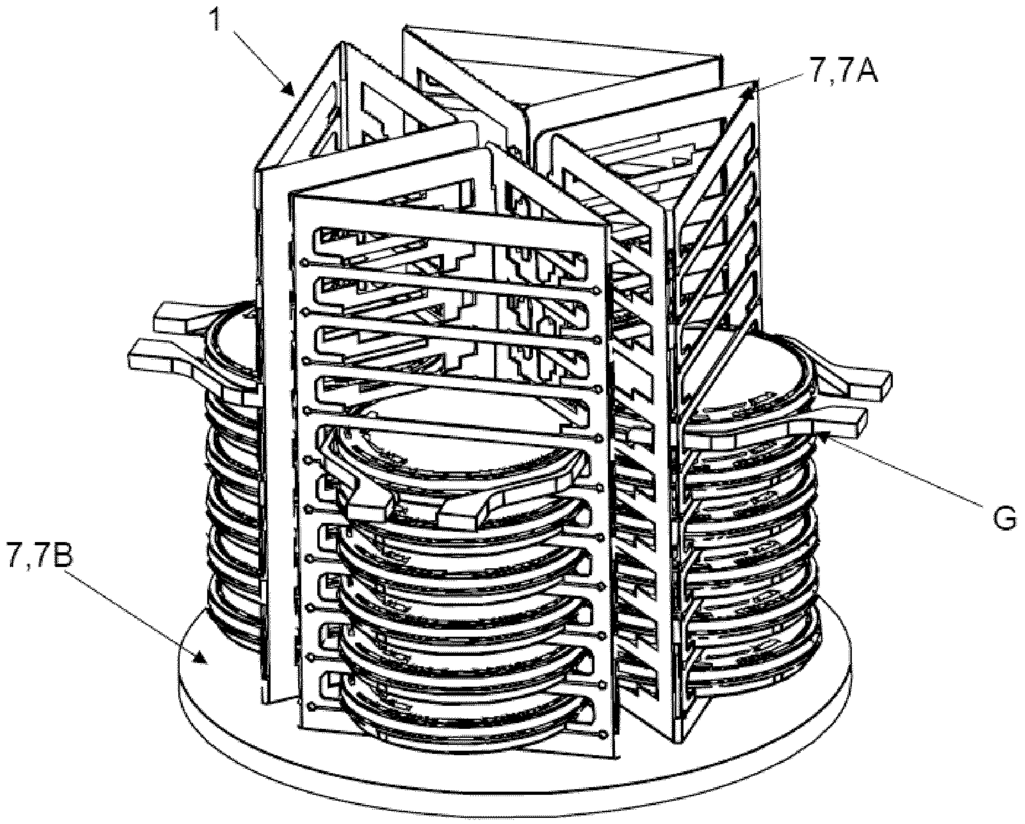
FIG. 15 is a perspective view of a four-sided arrangement of four racks of FIG. 9 in an upright orientation on a separate external stand

While the stand 7A described above can be formed as an integral stand of the rack, a separate external stand 7B may be provided as an alternative or in addition to even further enhance the rigidity of the rack in the upright orientation, in particular where access to the petri-dishes is to be made by automated manipulators (see FIG. 14). The separate external stand 7B may be provided with guiding pins 7B2 erected on a base 7B1 and engageable with mating receptacles on the rack. Plural mounting positions for racks can be provided on a single external stand 7B, and the stand can be either fixed or mobile, by rotation for example, to allow transfer between multiple grippers (see FIG. 15).

In a preferred embodiment such an enlarged external stand 7B may accommodate four racks distributed equally about the circumference to allow access from several directions or to present different racks to one direction upon rotation of the stand 7B by regular intervals.

Figure 5:
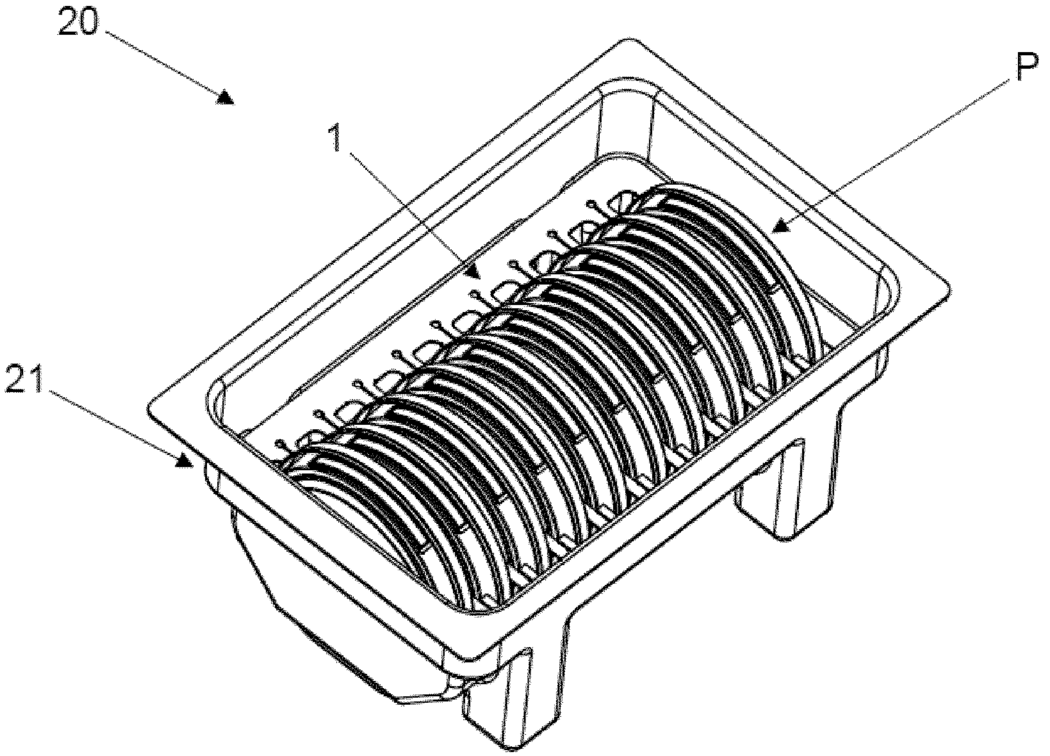
FIG. 5 is a perspective view from the top of a transport packaging rack of FIG. 2 received in the packaging.
Figure 6:
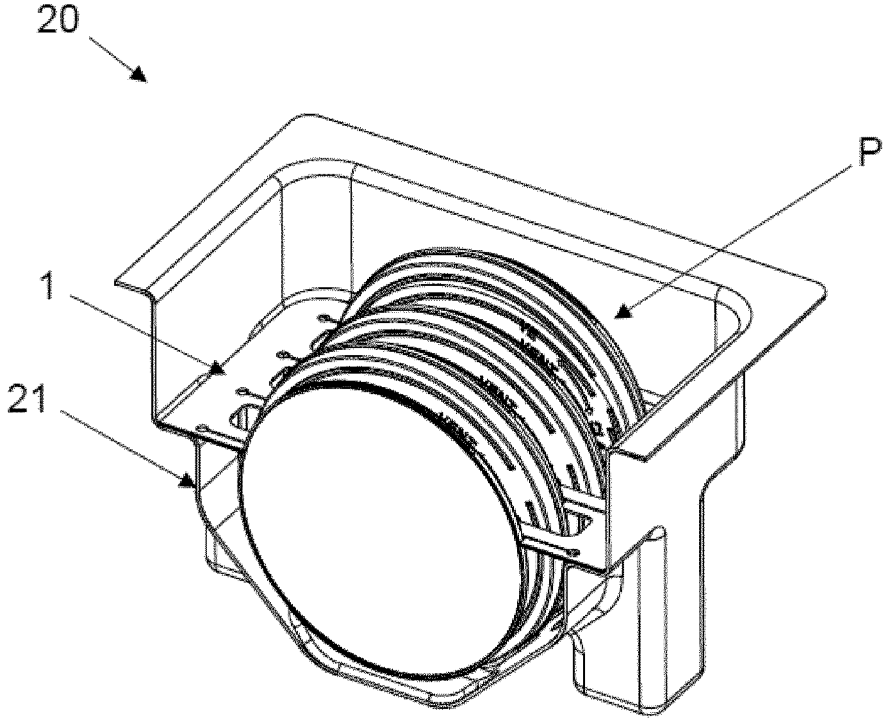
FIG. 6 is a partially cut-away view of the transport packaging FIG. 5.
Figure 7:
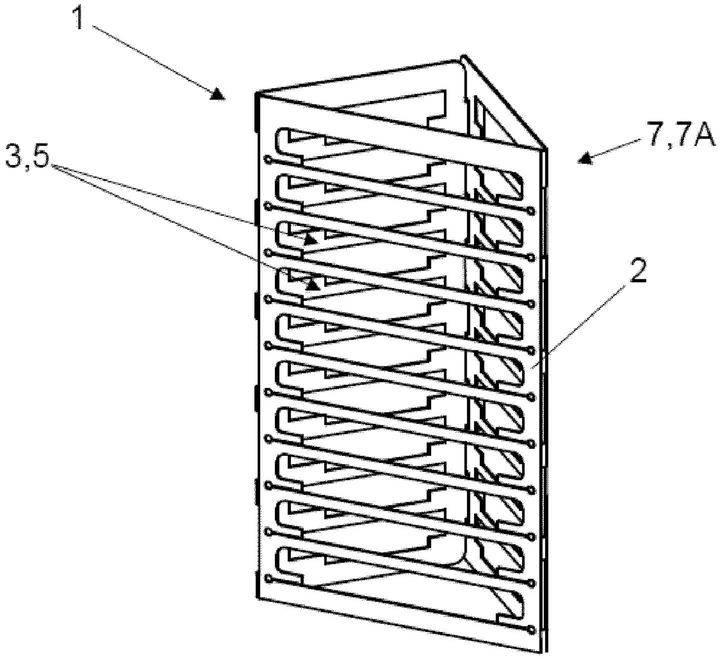
FIG. 7 is a perspective view of an embodiment of the rack with a stand in the operative position.
Figure 13:
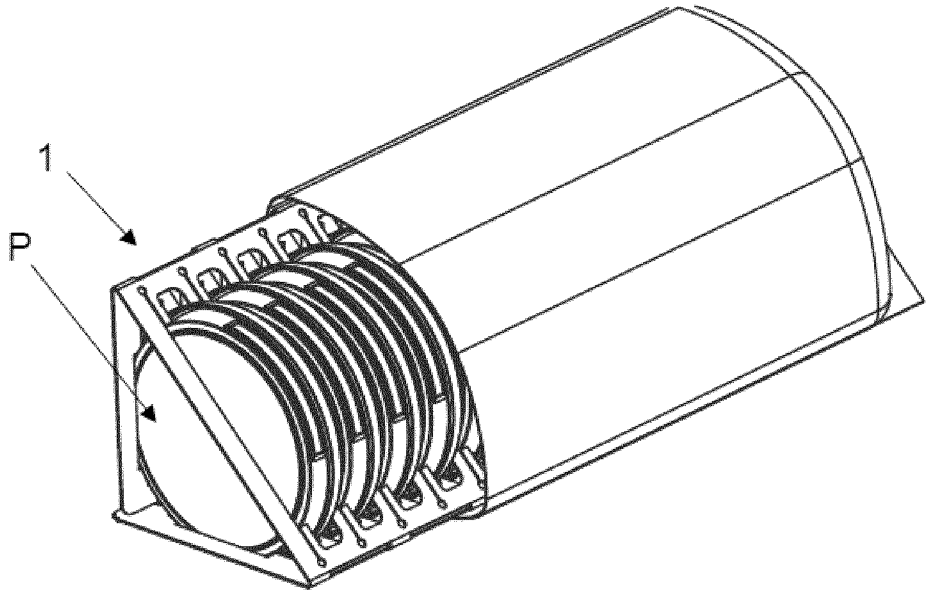
FIG. 13 is a perspective view of the rack of FIG. 9 placed in a bag as an example for a transport packaging.

The rack with a group of petri-dishes and, if provided, the members of the stand for forming the three-dimensional, self-supporting frame for the rack can be packaged in a bag as shown in FIG. 13 or in a more rigid box-shaped tub 21 that respectively removably receive and completely surround the rack with the petri-dishes as shown in FIG. 5. Accordingly, the rack with the box-shaped tab or bag forms a transport packaging for a plurality of petri-dishes P. The rack with the members of the stand can be either pre-assembled and arranged in the transport packaging in the three-dimensional structure or the stand can be arranged in the storing position as shown, for example, in FIG. 5 or 6. The stand may also be omitted if the rack alone is sufficient for the desired handling and purpose.

The box-shaped tub 21 is formed as a one-piece blister cavity, preferably is formed from a formable sheet of a plastic material, further preferably by thermal forming or cold-forming or a combination of the two. The tub 21 may be designed for one-time use or may be reusable.

The opening of the box-shaped tub 21 is configured to be sealed by a gas-barrier film, preferably at least partially transparent, to form a blister-like packaging. In conjunction with a sterilized set of petri-dishes held in the rack such sealed transport packaging provides a useful unit for use in connection with the environmental monitoring as described in the introductory portion of this specification. In a preferred embodiment the box-shaped tub 21 and the rack and its elements are made from the same material, thus facilitating the waste-processing of the material after use.

If a separate stand 7B is to be provided for the rack instead of or in addition to an integrated stand 7A it may be additionally received in the transport packaging to be available at the point of use.

The invention claimed is:

1. A rack (1) for holding a plurality of petri-dishes (P), comprising:

a main body plate (2) with a plurality of adjacent and spaced apart holding portions (3) each configured to receive and support, in a substantially horizontal orientation that is substantially perpendicular to a plane of the main body plate (2), a petri-dish (P), wherein each holding portion (3) includes positioning features (4) for positioning the petri-dish (P) in said each holding portion (3), wherein each holding portion (3) is respectively formed as a cutout (5) in the main body plate (2) so as to surround, along a cross-section perpendicular to upper and lower surfaces of a tray (P2) and a lid (P1) of the Petri-dish (P) to be received in the holding portion (3), an outer perimeter (PP) of the Petri-dish (P) to be received in the holding portion (3) and so as to allow at least partial insertion of the Petri-dish (P) into the cutout (5).

2. The rack (1) according to claim 1, wherein the positioning features (4) comprise one or more flexible tabs (4*a*) configured to contact a-circumferential peripheral wall (Pc) of the petri-dish (P) when the same is placed in the cutout (5).

3. The rack (1) according to claim 1, wherein the holding portions (3) are formed in the main body plate (2) so that a front surface of the main body plate (2) is parallel to and offset by a distance (D) from a plane containing the centers (PO) of the plural petri-dishes (P) when the petri-dishes (P) are received in the holding portions (3).

4. The rack (1) according to claim 1, wherein the plate-like main body (2) is formed as parts stamped or cut-out from a sheet-like material.

5. The rack (1) according to claim 1, further comprising a stand (7;7A;7B) configured to be assembled with the main body plate (2) to hold the main body plate in an upright orientation so that any petri-dishes (P) can be received and supported in the holding portions (3) in the substantially horizontal orientation.

6. The rack (1) according to claim 5, wherein the stand (7;7A;7B) is removable from the main body plate (2) or is connected to the main body plate (2) and/or is foldable or pivotable between a storing position and an operative position where it-the stand (7;7A;7B) can hold the main body plate (2) in the upright orientation.

7. The rack (1) according to claim 5, wherein the stand (7A) comprises one or more members (7A1,7A2) that are configured to be assembled to form, with the main body plate (2), a three-dimensional, self-supporting frame for the rack (1) in the operative position.

8. The rack (1) according to claim 5, wherein the one or more members (7A1,7A2) is/are provided with engaging features (9) that are respectively aligned with the holding portions (3) to additionally support the petri-dish (P) in the respective holding portion (3) in the substantially horizontal orientation when in the operative position.

9. A rack (1) for holding a plurality of petri-dishes (P), comprising:

a main body plate (2) with a plurality of adjacent and spaced apart holding portions (3) each configured to receive and support, in a substantially horizontal orientation that is substantially perpendicular to a plane of the main body plate (2), a Petri-dish (P), wherein each holding portion (3) includes positioning features (4) for positioning the petri-dish (P) in said each holding portion (3), wherein each holding portion (3) is respectively formed as a cutout (5) in the main body plate (2) so as to surround, along a cross-section perpendicular to upper and lower surfaces of a tray (P2) and a lid (P1) of the Petri-dish (P) to be received in the holding portion (3), an outer perimeter (Pp) of the Petri-dish (P) to be received in the holding portion (3) and so as to allow at least partial insertion of the Petri-dish (P) into the cutout (5), wherein the main body plate (2) includes, at a periphery of each cutout (5), at least two openings or recesses (6) spaced apart from each other about the periphery of the cutout (5) and configured to allow insertion of a manipulating device (G) or of a finger for grabbing/pinching of a circumferential peripheral wall (Pc) of a petri-dish (P) when the same is placed in the cutout (5).

10. A transport packaging (20) for a plurality of petri-dishes (P), comprising:

a rack (1) according to claim 1; and a box-shaped tub (21) or bag configured to removably receive and completely surround the rack (1).

11. The transport packaging (20) for a plurality of petri-dishes (P) according to claim 10, wherein the box-shaped tub (21) is formed as a one-piece blister cavity.

12. The transport packaging (20) for a plurality of petri-dishes (P) according to claim 10, wherein the box-shaped tub (21) and the rack (1) are made from the same material.

13. The transport packaging (20) for a plurality of petri-dishes (P) according to claim 10, comprising a plurality of petri-dishes (P) accommodated in the rack (1).

14. A blister packaging with a plurality of petri-dishes (P), comprising:

a transport packaging (20) according to claim 13, wherein the plurality of petri-dishes (P) are accommodated in the rack (1) in the box-shaped tub (21) in a sterile environment; and a gas barrier film sealing the opening of the box-shaped tub (21).

15. The transport packaging (20) for a plurality of petri-dishes (P) according to claim 10, wherein the box-shaped tub (21) is formed as a one-piece blister cavity formed from a formable sheet or web material.

16. The blister packaging according to claim 14, wherein the gas barrier film is at least partially transparent.

* * * * *